United States Patent
Rivera et al.

(10) Patent No.: US 11,010,919 B2
(45) Date of Patent: May 18, 2021

(54) OBJECT LOCATOR WITH FIDUCIAL MARKER

(71) Applicant: Ford Global Technologies, LLC, Dearborn, MI (US)

(72) Inventors: Alberto Gabriel Rivera, San Francisco, CA (US); Tejaswi Koduri, Mountain View, CA (US); Romil Shah, Santa Clara, CA (US); Shounak Athavale, San Jose, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 120 days.

(21) Appl. No.: 16/136,379

(22) Filed: Sep. 20, 2018

(65) Prior Publication Data

US 2020/0098131 A1    Mar. 26, 2020

(51) Int. Cl.
*G06T 7/73* (2017.01)
*G06T 7/62* (2017.01)

(52) U.S. Cl.
CPC ............... *G06T 7/73* (2017.01); *G06T 7/62* (2017.01); *G06T 2207/10016* (2013.01); *G06T 2207/30204* (2013.01); *G06T 2207/30252* (2013.01)

(58) Field of Classification Search
CPC ... G06T 7/73; G06T 7/62; G06T 2207/30252; G06T 2207/10016; G06T 2207/30204; G06K 7/1417; G06K 7/1456
See application file for complete search history.

(56) References Cited

U.S. PATENT DOCUMENTS

| | | | |
|---|---|---|---|
| 8,411,086 B2 | 4/2013 | Rieffel et al. | |
| 9,566,911 B2 | 2/2017 | Greenwood et al. | |
| 2002/0158873 A1 | 10/2002 | Williamson | |
| 2014/0097238 A1* | 4/2014 | Ghazizadeh | G01D 18/00 235/375 |
| 2015/0294492 A1 | 10/2015 | Koch et al. | |
| 2017/0249745 A1 | 8/2017 | Fiala | |
| 2017/0361726 A1* | 12/2017 | Widmer | B60L 53/122 |
| 2019/0250603 A1* | 8/2019 | Tod | H04N 7/183 |

OTHER PUBLICATIONS

Morrison, "Fiducial marker detection and pose estimation from LIDAR range data", Monterey, California, Naval Postgraduate School, Mar. 2010, http://hdl.handle.net/10945/5411.

* cited by examiner

*Primary Examiner* — Jon Chang
(74) *Attorney, Agent, or Firm* — Brandon Hicks; Bejin Bieneman PLC (57) ABSTRACT

From detecting a marker detected in an image, a physical object on which the marker is provided can be identified. Based on a determining a location of the marker in the physical world, a location and an orientation of the physical object can be determined.

19 Claims, 5 Drawing Sheets

OBJECT LOCATOR WITH FIDUCIAL MARKER

BACKGROUND

Various sensors can provide data to detect and/or locate objects in a physical, i.e. real-world, environment. For example, sensors such as video cameras, lidar, radar, ultrasonic sensors, etc. can provide data to detect an object and predict a real-world location of the object. However, processing data from such sensors can be computationally expensive, i.e., can consume relatively large amounts of valuable processor cycles and/or memory in a computer that analyzes the data. Further, such sensor data may not describe an object and/or its location with a desired precision, e.g., dimensions (length, width, height, etc.) of an object may be provided with an unreasonable margin of error or certainty.

DETAILED DESCRIPTION

Introduction

Disclosed herein is a method, comprising identifying, from detecting a marker detected in an image, a physical object on which the marker is provided; and based on determining a physical world location of the marker, determining a location and an orientation of the physical object in the physical world. The method can further comprise including the physical object in a map of a physical environment. The method can further comprise actuating a component of a vehicle based on the map. The method can further comprise determining a distance of a part of the object from a point in the physical world. The orientation can include a pitch, a yaw, and a roll. The object can be a vehicle. The method can further comprise detecting a second marker in the image, and determining the location or orientation of the physical object based on a location of the second marker in the physical world in addition to the location of the marker in the physical world. The image can be a frame of video data. The method can further comprise retrieving dimensions of the physical object upon identifying the physical object from determining the marker, and determining the location and the orientation of the physical object in part based on the dimensions. The method can further comprise determining, from the image, a first physical distance between first and second indicia in the marker, and, based in part on the first physical distance, then determining a second physical distance of the marker from a camera used to capture the image.

A computer comprises a processor and a memory. The memory can store instructions executable by the processor to: identify, from detecting a marker detected in an image, a physical object on which the marker is provided; and based on determining a physical world location of the marker, determine a location and an orientation of the physical object in the physical world. The instructions can further comprise instructions to include the physical object in a map of a physical environment. The instructions can further comprise instructions to actuate a component of a vehicle based on the map. The instructions can further comprise instructions to determine a distance of a part of the object from a point in the physical world. The orientation can include a pitch, a yaw, and a roll. The object can be a vehicle. The instructions can further comprise instructions to detect a second marker in the image, and determine the location or orientation of the physical object based on a location of the second marker in the physical world in addition to the location of the marker in the physical world. The image can be a frame of video data. The instructions can further comprise instructions to retrieve dimensions of the physical object upon identifying the physical object from determining the marker, and determine the location and the orientation of the physical object in part based on the dimensions. The instructions can further comprise instructions to determine, from the image, a first physical distance between first and second indicia in the marker, and, based in part on the first physical distance, then determine a second physical distance of the marker from a camera used to capture the image.

Exemplary System Elements

Figure 1:
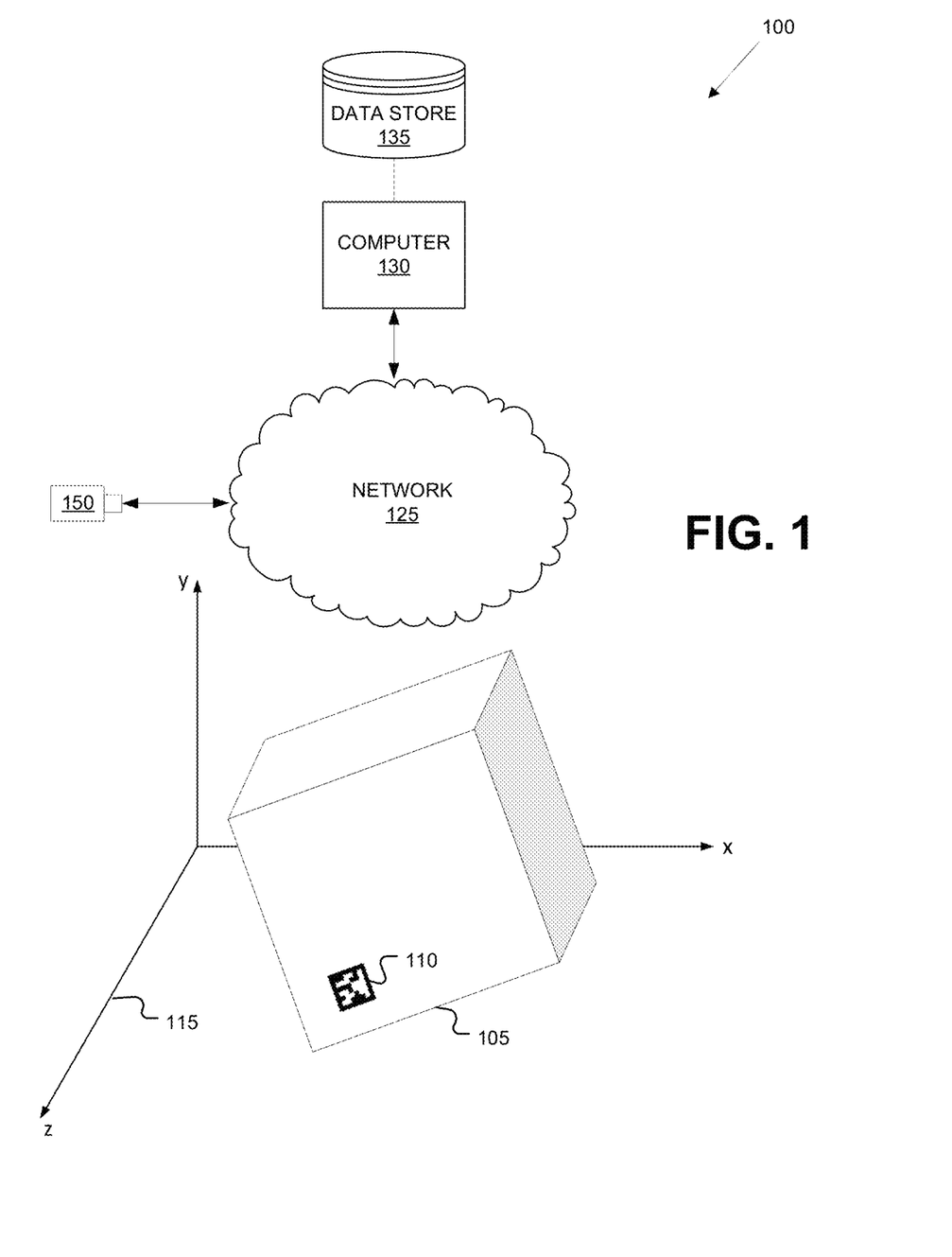
FIG. 1 is a diagram illustrating an example system for locating an object with a marker.

FIG. 1 is a diagram illustrating an example system 100 for locating a target object (or target) 105 with a marker 110, also sometimes referred to as a fiducial marker 110 because the marker 110 is provided as a reference for determining pose and orientation from an image that includes the marker 110. Based on data from a video camera 150, which may be transmitted to a computer 130, the computer 130 can determine dimensions and a pose (i.e., location and orientation) of the target 105, typically with respect to a three-dimensional coordinate system, e.g., a Cartesian coordinate system, 115. To determine the target 105 pose, the computer 130 can identify, from camera 150 data, the fiducial marker 110. By decoding an identifier in the fiducial marker 110, the computer 130 can then retrieve from a data store 135 data about the target 105, typically including a position of the marker 110 on the target 105, as well as dimensions of the target 105. The computer 130 may further be programmed, e.g., based on a map of an environment in which the target 105 is detected, to provide a location of the target 105 in the environment.

Example implementations are discussed herein in which the target 105 is a vehicle 105v (see FIG. 4), e.g., a land vehicle such as a car, truck, or motorcycle. However, the target 105 could be any physical object in a real-world, i.e., physical, environment, e.g. furniture, electronics device, a tool such as a screwdriver, hammer, or pliers, a basketball, etc., just to name a few of the countless possible examples.

The computer 130 includes a processor and a memory such as are known. The memory includes one or more forms of computer-readable media, and stores instructions executable by the computer 130 for performing various operations, including as disclosed herein. The data store 135 may be a memory of the computer 130 and/or a conventional data store communicatively coupled to the computer 130, including possibly via a network 125.

The network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2A:
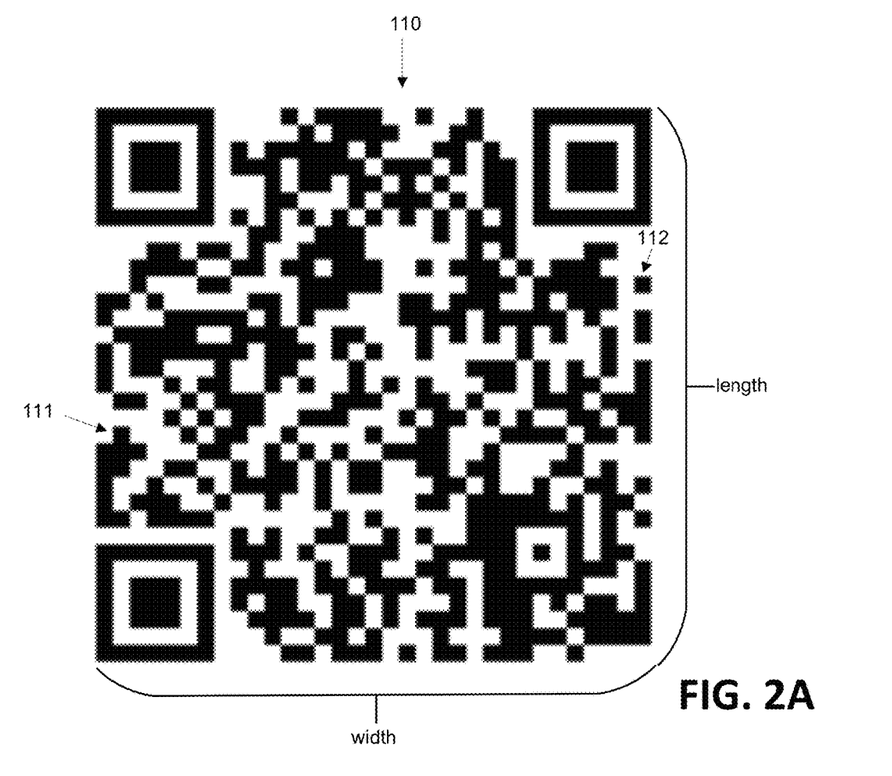
FIGS. 2A-2C are illustrations of example markers.
Figure 2B:
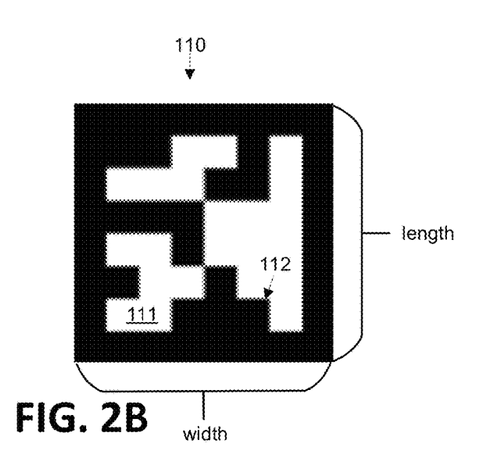
Figure 2C:
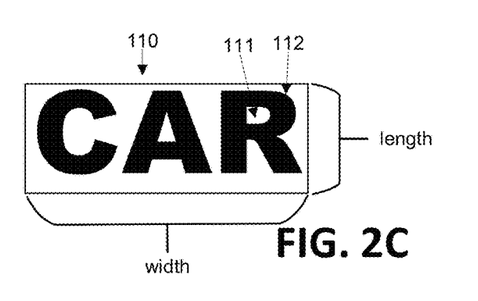

The fiducial marker 110 can be any visual pattern that identifies a target 105. FIGS. 2A, 2B, and 2C show just a few examples of markers 110. For example, FIG. 2A implementation, the fiducial marker 110 is what is known as a Quick Response (QR) code; as is known, a QR code may be used to encode an identifier that may be decoded upon acquiring an image of the QR code. However, a QR code provides a level of complexity, e.g., allows for more variation and encoding of data, than may be needed for the system 100. FIG. 2B shows an example with a simpler pattern that will typically require less processing and/or less processing time to decode and/or analyze. FIG. 2C shows yet a further example marker 110. In general, as FIGS. 2A-2C illustrate, a fiducial marker 110 could include other identifying visual patterns, e.g., a pattern of letters and/or numbers, a barcode, or other shapes, lines, or markers (e.g., as could be provided in a corporate logo or the like on a vehicle 105v).

Each fiducial marker 110 employed in an object-locating system 100 should be substantially unique with respect to a class of targets 105 and a position of the marker 110 on each target 105. In the present context, a class of targets 105 means one or more targets 105 having substantially identical three dimensional models. and hence substantially identical dimensions. Thus, in some implementations, one fiducial marker 110 can be affixed to a plurality of targets 105, so long as each of the plurality of targets 105 belong to a same class of targets 105, although implementations are also possible in which each fiducial marker 110 uniquely identifies a specific target 105. Further, two or more markers 110 could be associated with a target 105 or class of targets 105, each of the two or more markers 110 specifying a different position on a surface of the target 105. Thus, in one example, respective markers 110 could be provided on a front, rear, left side, and/or right side of a vehicle 105v to allow a camera 152 detect a marker 110 from various perspectives of the target 105.

The data store 135 typically includes a plurality of data records, where each data record is substantially uniquely identified by an identifier that can be decoded from a fiducial marker 110. Each data record identified by a marker 110 identifier includes data about a target 105 or class of targets 105, including a description of a target 105 dimensions. In the present context, target dimensions are a three-dimensional description of the target 105, i.e., data from which a space that the target 105 will occupy in a physical environment can be predicted. In the present context, a dimension is a measurable extent along a line, e.g., a length, a width, and/or a height. The target 105 can be represented by a regular geometric shape such as a rectangular solid (see FIG. 1); in this example, the target 105 geometry could be provided by giving a length, width, and height of the rectangular solid. A data record identified by a marker 110 identifier can alternatively or additionally include a three-dimensional model of the target 105; a space that the target 105 will occupy in a physical environment can be predicted from a pose of the target 105, determined as described below, in combination with the three-dimensional model. The three-dimension data model includes a model of a target 105 along with the marker 110 in three-dimensions, and models the target 105 and marker 110 to represent them in real-world space. A record for a marker 110 typically also includes data specifying a position of the marker 110 on a surface of the target 105 so that the target 105 location can be determined from analysis of a camera 150 image of the target 105 including the marker 110.

The camera 150 can provide digital images, e.g., as frames of video in a compressed format such as MPEG or the like. MPEG refers to a set of standards generally promulgated by the International Standards Organization/International Electrical Commission Moving Picture Experts Group (MPEG). Each frame in video data from the camera 150 can be a specified number of pixels wide by a specified number of pixels tall. Accordingly, a coordinate system for video image frames may be defined, e.g., an XY Cartesian coordinate system, e.g., having an origin in a upper left-hand corner of the frame. A marker 110 can be identified in a frame according to various image or pattern recognition techniques, and then coordinates of the marker 110 in the frame can be determined as further described below.

The camera 150 can be deployed in a fixed or stationary manner, i.e., with a pose fixed according to a predetermined specification. A pose of an object such as a target 105 or camera 150 means an orientation (e.g., a yaw, a pitch, and a roll) and a location (e.g., a set of coordinates specifying a position in a coordinate system, e.g., X, Y, Z coordinates). The predetermined pose of the camera 150 can be a basis for determining a marker 110 pose, i.e., location and orientation upon identifying the marker 110 in a frame of video data from the camera 150.

For example, once a marker 110 is identified in a frame of camera 150 data, e.g., according to programming in a computer 130 implementing a pattern recognition technique, the computer 130 can retrieve a marker 110 data record from the data store 130. Referring now to FIGS. 2A-2C, marker 110 data record can specify dimensions of the marker 110, e.g., a length and a width, as well as specific indicia 111, 112 in the marker 110, e.g., according to an XY coordinate system.

A marker indicia 111, 112 is an identifiable shape or marking in a marker 110, e.g., an individual square mark in a marker 110, that can be identified by the computer 130 in an image of the marker. That is, the computer 130 can identify pixels in the marker 110 image representing the specific indicia 111, 112, e.g., by recognizing a shape or combination of shapes in the marker 110 image. A Euclidean, i.e., linear, distance, e.g., measured in pixels, between first and second indicia 111, 112 in a marker 110 image can then be determined, e.g., by using the Pythagorean theorem to determine a distance between respective XY coordinates for two points in the marker 110 image.

The computer 130 (or the data store 135) can further store a table or the like specifying a first physical distance, i.e., a real-world, i.e., physical, distance from the camera 150 indicated by respective numbers of pixels being included in a distance between first and second indicia 111, 112 in the marker 110 image. Further, a marker 110 data record can specify a second physical distance, i.e., a physical Euclidean or linear distance between the indicia 111, 112. Based on the first physical distance and the second physical distance, a location of the marker 110 in the physical world can be determined. That is, the location can be provided according to XYZ coordinates of the marker 110 in a coordinate system 115 pertaining to the physical world determined, e.g., according to principles of Euclidean geometry including the Pythagorean theorem.

An orientation of a marker 110 according to the real-world coordinate system 115 can also be determined from a marker 110 image. For example, the coordinate system 115 can define XY, XZ, and YZ planes. The computer 110 can determine respective angles of a line between the two points in the marker 110 and each of the XY, XZ, and YZ planes. These angles can be used to give pitch, yaw, and roll, i.e., orientation. The terms pitch, yaw, and roll should be given their conventional meanings herein. For example, with respect to a vehicle such as an aircraft or an automobile, pitch is rotation about a lateral axis, yaw is rotation about a vertical axis, and roll is rotation about a longitudinal axis (e.g., the lateral, vertical, and longitudinal axes of a vehicle could be, or could be parallel to, respective X, Y, and Z axes in an XYZ coordinate system). An orientation of an object such as a marker 110 or target 105 can be specified according to a pitch, yaw, and roll.

Figure 3:
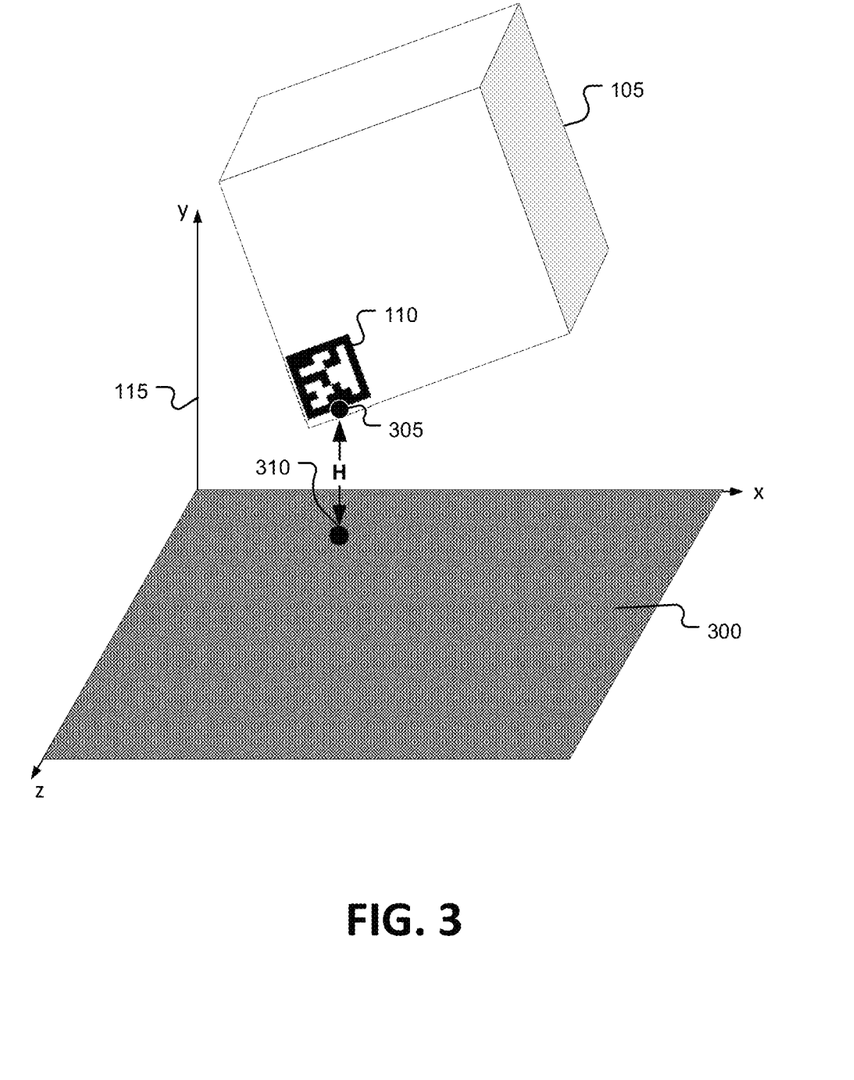
FIG. 3 illustrates an example of locating a target in a physical environment.

FIG. 3 illustrates an example of locating a target 105 in a physical environment, specifically, determining a height H of a marker 110 above a ground surface 300. In the example of FIG. 3, the ground surface 300 is represented as substantially planar, i.e., the XZ plane of the three-dimensional coordinate system 115, although of course in practice even a surface of a flat road or other ground surface would not be perfectly planar. The height H is a distance between a specified point 305, e.g., a specified XYZ coordinate, on a surface of the target 105, and a point 310, e.g., another specified XYZ coordinate, on the ground surface 300. As explained above, a location and orientation, i.e., pose, of the target 105 can be determined with respect to a three-dimensional coordinate system 115 provided for a map of the physical environment. The target 105 point 305 coordinates are coordinates determined with respect to the marker 110, e.g., the point 305 can be a midpoint of a bottom edge of the marker 110. Every location or point on the marker 110 can be mapped to a location or point, i.e., three-dimensional coordinates, on a surface of the target 105, as explained above. The point 310 can then be determined by drawing a vertical line, e.g., in the example of FIG. 3 a line parallel to the Y axis in the coordinate system 115, from the point 305 to the ground surface 300.

Determining a height H, or more generally, a distance of a point or set of points on a surface of a target 105 from one or more other points in a physical environment, can have a variety of applications. In one example, when the target 105 is a vehicle 105v, determining a height H is useful to determine a clearance between the vehicle 105v and a ground surface 300. For example, a three dimensional map of a roadway such as a road in a city, a racetrack, etc., could be provided, and a camera 150 used to capture images of a vehicle 105v, including a marker 110, while the vehicle 105v is moving on the roadway. Based on a location of a marker 110 on a vehicle 105v surface, including a distance of the marker 110 from a bottom edge of the vehicle 105v, the height H could then be determined to determine a distance or clearance of the vehicle 105v from the roadway. A distance of a target 105 such as a vehicle 105v from other objects could likewise be determined. For example, instead of a ground surface 300, a distance of a vehicle 105v from some other object such as a wall, a building, a road sign, etc., could be determined.

Figure 4:
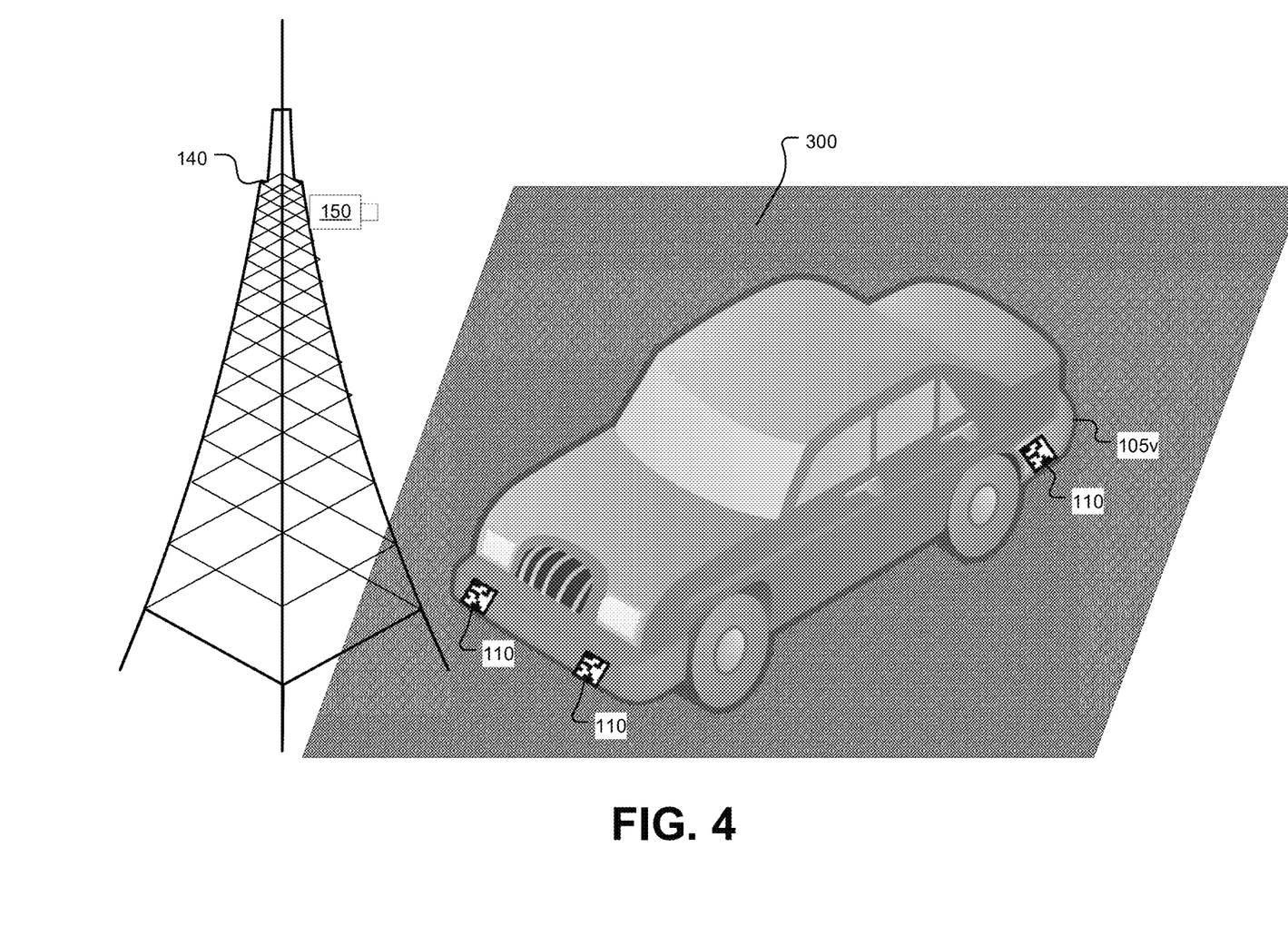
FIG. 4 is an illustration of an implementation of the system of FIG. 1 with respect to a vehicle.

FIG. 4 is an illustration of an implementation of the system of FIG. 1 with respect to a vehicle. A camera 150 is mounted to an infrastructure element 140, i.e., a stationary physical structure to which a camera 150 may be fixedly (i.e., so that the camera 150 cannot move or rotate) mounted. The infrastructure element 140 can be any suitable stationary physical structure, such as a tower, a pole, a bridge stanchion, a road sign support, a side of a building, etc. In the example of FIG. 4, a plurality of markers 110, each of which should be associated with a different substantially unique identifier as described above, are provided at respective locations on a surface of the vehicle 105v. Thus, the camera 150 may be able to determine dimensions and a pose of the vehicle 105v from different perspectives.

Further, more than one marker 110 can be used to determine a target 105, in this example the vehicle 105v, dimensions and/or pose. For example, FIG. 4 illustrates markers 110 on a front bumper of the vehicle 105v. The computer 130 could be programmed to determine a first vehicle 105v pose from a first marker 110, and a second vehicle 105v pose from a second marker 110. First and second heights H could then be determined from the first and second poses. The computer 130 could then average the heights H to provide a determined height H of the vehicle 105v from a ground surface 300.

Figure 5:
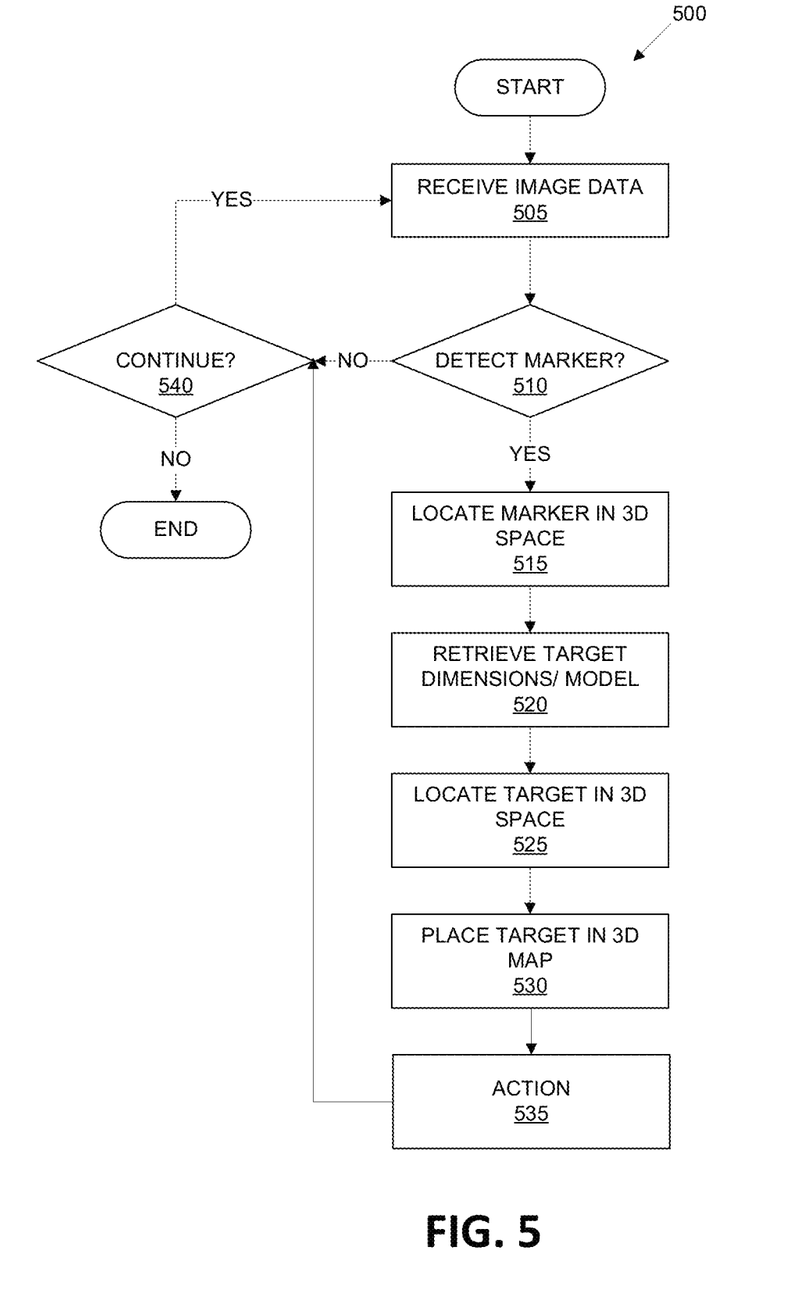
FIG. 5 is a flowchart of an exemplary process for locating an object including a fiducial marker with respect to a real-world environment.

FIG. 5 is a flowchart of an exemplary process for locating an object including a fiducial marker with respect to a real-world environment. The process 500 can be executed according to programming in a computer 130 which, as described above, a camera 150 could provide data via a network 125. Alternatively, the computer 130 could be local to the camera 150, e.g., co-mounted on an infrastructure element 140, included in a same housing, etc.

The process 500 begins in a block 505, in which the camera 150 receives a frame of image data, e.g., typically as one of a plurality of frames received sequentially, i.e., as a stream of video data.

Next, in a block 510, the camera 150 analyzes the received frame, e.g. according to conventional image analysis or pattern recognition techniques, to determine whether a marker 110 is detected in the received image data.as mentioned above, it is possible that the camera 150 could detect a plurality of markers 110 in a frame of image data. If a marker 110 is detected, then a block 515 is executed next. Otherwise, the process 500 proceeds to a block 540.

In the block 515, the computer 130 determines coordinates for the marker 110 in three-dimensional space, e.g., according to a coordinate system 115 as described above. For example, the computer 130 can be programmed to decode a marker 110 identifier from the marker 110, and to retrieve, e.g., from a data store 135, a record including data about the marker 110 as described above. Thus, the computer 130 could identify indicia 111, 112, as described above, and could further determine coordinates in three-dimensional space for the indicia 111, 112. Moreover, the computer 130 can then determine coordinates of edges, corners, or any point, such as a point 305, of the marker 110.

Next, in a block 520, the computer 130 retrieves, e.g., from the data store 135, data describing a target 105 specified and/or included in the marker 110 record retrieved in the block 515. Typically, the data describing the target 105 includes dimensions, e.g., height, width, and length, of the target 105. The data could alternatively or additionally include a three-dimensional model.

Next, in a block 525, the computer 130 identifies a pose of the target 105 in three-dimensional space. That is, the computer 130 determines a location and orientation according to one or more triplets of XYZ coordinates in the coordinate system 115 as described above.

Next, in a block 530, the computer 130 locates the target 105 in a map of a physical environment. For example, the map may have coordinates corresponding to the coordinate system 115, allowing the target 105 to be scaled and oriented for placement in the map. A distance of the target 105 from a point in the map, e.g., a distance of a lower edge of a vehicle 105v from a point 310 on a ground surface 300, as described above, could be determined.

Next, in a block 535, the computer 130 could take one or more actions based on the determinations of the target 105 pose and/or location in a physical environment map. For example, the computer 130 could store the data in the data store 135. Alternatively or additionally, the computer 130 could transmit the data, e.g., via the network 25, e.g., back to a target vehicle 105v. The target vehicle 105v could then use the data transmitted by the computer 130 as a basis for actuating a vehicle 105v component. For example, if a height H between a bottom edge of the vehicle 105v and a ground surface 300 was higher or lower than a threshold, a vehicle computer could provide instruction to adjust a vehicle 105v suspension. Similarly, if a vehicle 105v was determined to be following a sub-optimal path of travel, e.g., to close to barrier such as a curb or a wall, a vehicle computer could actuate vehicle 105v steering to modify a path of the vehicle 105v.

Following the block 535 or the block 510, in a block 540, it is determined whether to continue the process 500. For example, a computer 130 or camera 150 could be powered off, input could be received to terminate the process, etc. If the process is to continue, the block 505 is executed next; otherwise, the process 500 ends following the block 540.

The system 100 can be utilized in a variety of environments. For example, one or more markers 110 could be placed on a vehicle 105 as described above in a variety of contexts. For example, the vehicle 105v could be a racecar, and the marker(s) 110 could be used to locate the vehicle 105v on a racetrack. For example, a height of the vehicle 105v with respect to a racetrack may be of particular interest to a race team.

In another example, a target vehicle 105v to be crash-tested can be outfitted with markers 110 on specified body panels. Video images can then be captured during a crash test as a vehicle 105v collides with an obstacle. The system 100 can provide accurate or precise measurements of locations and/or movements of specified parts of the target vehicle 105v body panels, or even crash dummies, with respect to the rest of the vehicle 105v, in essence mapping the crash to a three-dimensional environment in substantially real time. Advantageously, the system 100 can then reduce the time it takes to analyze a crash test as well as provide additional insights. Similarly, movement of specified parts of a vehicle 105v could be measured, located, monitored, etc., during a ride test.

In another example, observe that many SLAM (Simultaneous Localization and Mapping) systems use point cloud data to model environments as well as objects and obstacles in the environment. Point clouds are often generated by lidar sensors. The system 100 could be used to recreate objects and obstacles in a vehicle 105v environment using a known representation of the environment, which could then be correlated to a marker (or markers) 110. Advantageously, SLAM applications could be provided that require only sensory input from a camera, as opposed to a much more expensive lidar, which could greatly decrease the complexity and cost of testing SLAM systems.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer comprising a processor and a memory, the memory storing instructions executable by the processor to:
   identify, from detecting a marker detected in an image, a physical object on which the marker is provided; and
   based on determining a physical world location of the marker, determine a location and an orientation of the physical object in the physical world, including a height of the physical object from a ground surface, wherein the height is determined based on locating the marker with respect to a three-dimensional map.

2. The computer of claim 1, wherein the orientation includes a pitch, a yaw, and a roll.

3. The computer of claim 1, the instructions further comprising instructions to detect a second marker in the image, and determine the location or orientation of the physical object based on a location of the second marker in the physical world in addition to the location of the marker in the physical world.

4. The computer of claim 1, the instructions further comprising instructions to retrieve dimensions of the physical object upon identifying the physical object from determining the marker, and determine the location and the orientation of the physical object in part based on the dimensions.

5. The computer of claim 1, the instructions further comprising instructions to determine, from the image, a first physical distance between first and second indicia in the marker, and, based in part on the first physical distance, then determine a second physical distance of the marker from a camera used to capture the image.

6. The computer of claim 1, the instructions further comprising instructions to include the object in a map of a physical environment.

7. A system comprising:
   a first computer that includes a first processor and a first memory, the first memory storing first instructions executable by the first processor to:
      identify, from detecting a marker detected in an image, a physical object on which the marker is provided, wherein the physical object is a vehicle; and
      based on determining a physical world location of the marker, determine a location and an orientation of the physical object in the physical world, including a height of the physical object from a ground surface, wherein the height is determined based on locating the marker with respect to a three-dimensional map; and
   a second computer that includes a second processor and a second memory, the second memory storing second instructions executable by the second processor to actuate a component of the vehicle based on the location and the orientation received from the first computer and that were determined in the first computer based on the physical world location of the marker.

8. The system of claim 7, wherein the orientation includes a pitch, a yaw, and a roll.

9. The system of claim 7, the first instructions further comprising instructions to detect a second marker in the image, and determine the location or orientation of the physical object based on a location of the second marker in the physical world in addition to the location of the marker in the physical world.

10. The system of claim 7, the first instructions further comprising instructions to retrieve dimensions of the physical object upon identifying the physical object from determining the marker, and determine the location and the orientation of the physical object in part based on the dimensions.

11. The system of claim 7, the first instructions further comprising instructions to determine, from the image, a first physical distance between first and second indicia in the marker, and, based in part on the first physical distance, then determine a second physical distance of the marker from a camera used to capture the image.

12. The system of claim 7, the first instructions further comprising instructions to include the object in a map of a physical environment.

13. A method, comprising:
identifying, from detecting a marker detected in an image, a physical object on which the marker is provided; and
based on determining a physical world location of the marker, determining a location and an orientation of the physical object in the physical world, including a height of the physical object from a ground surface, wherein the height is determined based on locating the marker with respect to a three-dimensional map.

14. The method of claim 13, wherein the orientation includes a pitch, a yaw, and a roll.

15. The method of claim 13, further comprising detecting a second marker in the image, and determine the location or orientation of the physical object based on a location of the second marker in the physical world in addition to the location of the marker in the physical world.

16. The method of claim 13, further comprising retrieving dimensions of the physical object upon identifying the physical object from determining the marker, and determine the location and the orientation of the physical object in part based on the dimensions.

17. The method of claim 13, further comprising determining, from the image, a first physical distance between first and second indicia in the marker, and, based in part on the first physical distance, then determine a second physical distance of the marker from a camera used to capture the image.

18. The method of claim 13, further comprising including the object in a map of a physical environment.

19. The method of claim 13, wherein the object is a vehicle, the method further comprising actuating a component of the vehicle based on the location and the orientation that were determined based on the physical world location of the marker.

* * * * *